(12) United States Patent
Chen et al.

(10) Patent No.: US 12,097,711 B2
(45) Date of Patent: Sep. 24, 2024

(54) FLUID-EJECTION DIE WITH STAMPED NANOCERAMIC LAYER

(71) Applicant: Hewlett-Packard Development Company, L.P., Spring, TX (US)

(72) Inventors: Chien-Hua Chen, Corvallis, OR (US); Michael G Groh, Corvallis, OR (US); Bo Song, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/919,006

(22) PCT Filed: Apr. 14, 2020

(86) PCT No.: PCT/US2020/028059
§ 371 (c)(1),
(2) Date: Oct. 14, 2022

(87) PCT Pub. No.: WO2021/211094
PCT Pub. Date: Oct. 21, 2021

(65) Prior Publication Data
US 2024/0100849 A1    Mar. 28, 2024

(51) Int. Cl.
*B41J 2/175* (2006.01)
*B41J 2/16* (2006.01)

(52) U.S. Cl.
CPC ......... *B41J 2/17553* (2013.01); *B41J 2/1606* (2013.01); *B41J 2/1632* (2013.01); *B41J 2/162* (2013.01)

(58) Field of Classification Search
CPC .... B41J 2/17553; B41J 2/1606; B41J 2/1632; B41J 2/162
See application file for complete search history.

(56) References Cited

U.S. PATENT DOCUMENTS

| | | | |
|---|---|---|---|
| 5,148,193 A | 9/1992 | Inamoto et al. |
| 5,212,496 A | 5/1993 | Badesha et al. |
| 5,230,926 A | 7/1993 | Narang et al. |
| 5,502,470 A | 3/1996 | Miyashita et al. |
| 5,759,421 A | 6/1998 | Takemoto et al. |
| 5,902,704 A | 5/1999 | Schoenborn et al. |
| 6,042,219 A | 3/2000 | Higashino et al. |
| 6,074,040 A | 6/2000 | Usui et al. |
| 6,151,045 A | 11/2000 | Beach et al. |
| 6,179,978 B1 | 1/2001 | Hirsch et al. |
| 6,312,103 B1 | 11/2001 | Haluzak |
| 6,312,808 B1 | 11/2001 | Veerasamy et al. |
| 6,737,109 B2 | 5/2004 | Stanton et al. |

(Continued)

FOREIGN PATENT DOCUMENTS

| | | |
|---|---|---|
| CN | 1177945 A | 4/1998 |
| CN | 1942317 A | 4/2007 |

(Continued)

*Primary Examiner* — Justin Seo
(74) *Attorney, Agent, or Firm* — Foley & Lardner LLP

(57) ABSTRACT

A fluid-ejection die cartridge includes a cartridge body. The fluid-ejection die cartridge includes a fluid-ejection die fluidically attached to the cartridge body. The fluid-ejection die is to eject fluid. The fluid-ejection die cartridge includes a stamped nanoceramic layer on an exposed fluid-ejection nozzle plate of the fluid-ejection die attached to the cartridge body.

15 Claims, 4 Drawing Sheets

(56) References Cited

U.S. PATENT DOCUMENTS

| | | |
|---|---|---|
| 7,594,718 B2 | 9/2009 | Soutar et al. |
| 8,042,908 B2 | 10/2011 | Clark et al. |
| 8,632,162 B2 | 1/2014 | Vaeth et al. |
| 8,690,288 B2 | 4/2014 | Gumina |
| 8,851,630 B2 | 10/2014 | Sambhy et al. |
| 8,991,954 B2 | 3/2015 | Govyadinov et al. |
| 9,044,943 B2 | 6/2015 | Chang et al. |
| 9,073,323 B2 | 7/2015 | Sambhy et al. |
| 9,221,247 B2 | 12/2015 | Cruz-Uribe et al. |
| 9,321,269 B1 | 4/2016 | Di Palma et al. |
| 9,855,566 B1 | 1/2018 | Craft et al. |
| 10,015,887 B2 | 7/2018 | Zenou et al. |
| 2001/0044030 A1 | 11/2001 | Veerasamy et al. |
| 2002/0000169 A1 | 1/2002 | Suda et al. |
| 2003/0020785 A1 | 1/2003 | Andrews |
| 2003/0210299 A1 | 11/2003 | Min et al. |
| 2004/0231780 A1 | 11/2004 | Clark et al. |
| 2004/0246291 A1 | 12/2004 | Kinpara |
| 2005/0012781 A1 | 1/2005 | Miura et al. |
| 2005/0068367 A1 | 3/2005 | Kato et al. |
| 2005/0243129 A1 | 11/2005 | Kim |
| 2007/0184193 A1 | 8/2007 | Cha et al. |
| 2008/0129780 A1 | 6/2008 | Cha et al. |
| 2008/0136868 A1 | 6/2008 | Lebens |
| 2008/0225083 A1 | 9/2008 | McAvoy et al. |
| 2008/0284810 A1 | 11/2008 | Shimizu et al. |
| 2009/0085972 A1 | 4/2009 | Sim et al. |
| 2009/0186293 A1 | 7/2009 | Fannin et al. |
| 2010/0151142 A1 | 6/2010 | Cornell et al. |
| 2010/0271445 A1 | 10/2010 | Sharan et al. |
| 2010/0315463 A1 | 12/2010 | Escude et al. |
| 2013/0216738 A1 | 8/2013 | Owusu et al. |
| 2014/0063132 A1 | 3/2014 | Scheffelin et al. |
| 2016/0203973 A1 | 7/2016 | Di et al. |
| 2017/0182778 A1 | 6/2017 | Cattaneo et al. |
| 2019/0329566 A1 | 10/2019 | Clark |
| 2020/0070515 A1 | 3/2020 | Kanaris et al. |
| 2022/0277983 A1 | 9/2022 | Kim et al. |

FOREIGN PATENT DOCUMENTS

| | | | |
|---|---|---|---|
| CN | 1970300 A | 5/2007 | |
| CN | 101557939 A | 10/2009 | |
| CN | 101909893 A | 12/2010 | |
| CN | 102036825 A | 4/2011 | |
| CN | 103085479 A | 5/2013 | |
| CN | 103619600 A | 3/2014 | |
| CN | 104245343 A | 12/2014 | |
| CN | 104253089 A | 12/2014 | |
| CN | 105711258 A | 6/2016 | |
| CN | 107953672 A | 4/2018 | |
| CN | 108367568 A | 8/2018 | |
| CN | 108778752 A | 11/2018 | |
| CN | 109910435 A | 6/2019 | |
| EP | 0568248 A2 | 11/1993 | |
| JP | 63-239063 A | 10/1988 | |
| JP | 01-226338 A | 9/1989 | |
| JP | 08-252919 A | 10/1996 | |
| JP | 2000-117977 A | 4/2000 | |
| JP | 2005066890 A * | 3/2005 | ............ B41J 2/1433 |
| JP | 2007-058187 A | 3/2007 | |
| JP | 2011-161903 A | 8/2011 | |
| JP | 2018-199318 A | 12/2018 | |
| KR | 10-2019-0099163 A | 8/2019 | |
| MX | 2017012076 A | 2/2018 | |
| TW | 200523126 A | 7/2005 | |
| TW | 201103758 A | 2/2011 | |
| WO | 97/35724 A1 | 10/1997 | |
| WO | 03/41963 A1 | 5/2003 | |
| WO | 2014/136440 A1 | 9/2014 | |
| WO | 2016/157715 A1 | 10/2016 | |
| WO | 2017/050808 A1 | 3/2017 | |
| WO | 2019/110591 A1 | 6/2019 | |

\* cited by examiner

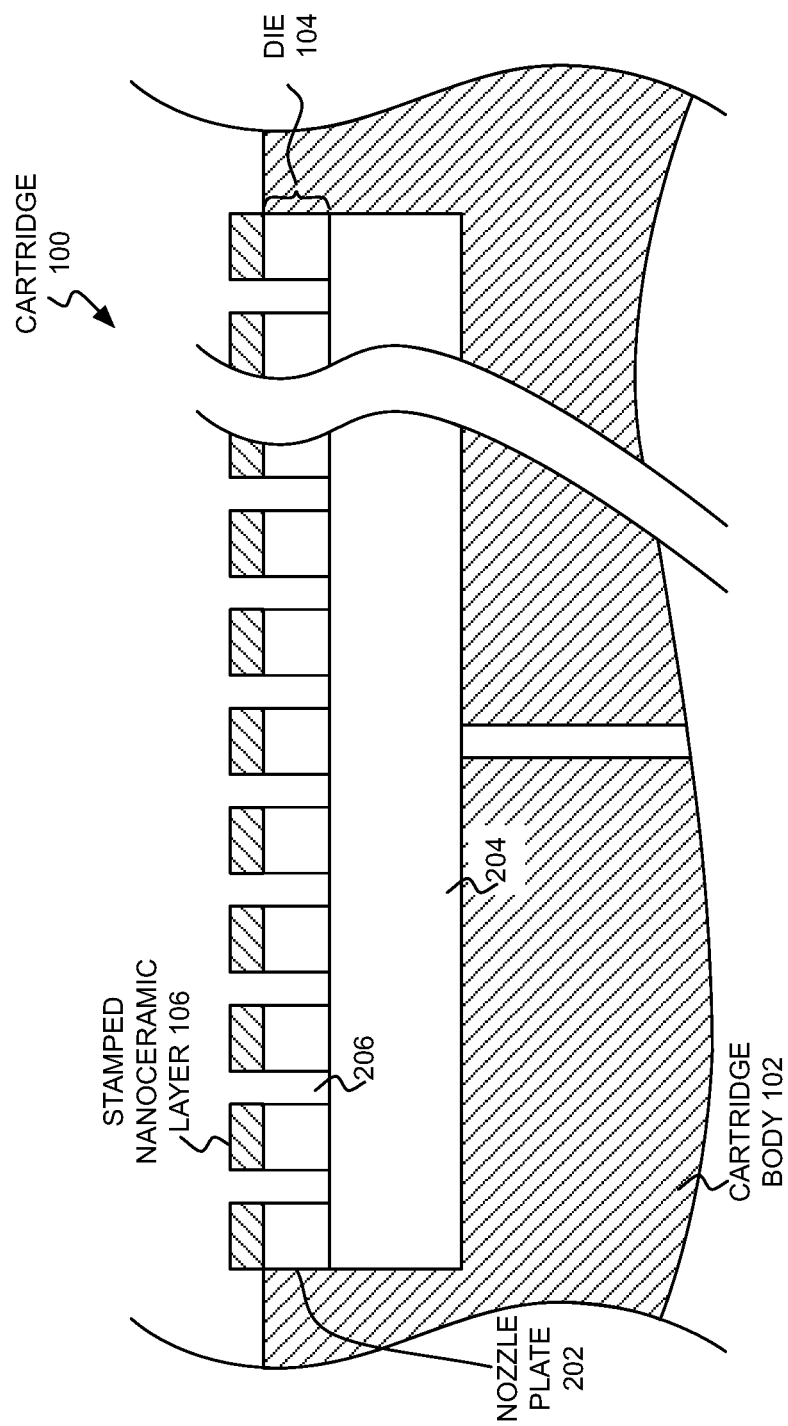

FLUID-EJECTION DIE WITH STAMPED NANOCERAMIC LAYER

BACKGROUND

Printing devices, including standalone printers as well as all-in-one (AIO) printing devices that combine printing functionality with other functionality like scanning and copying, can use a variety of different printing techniques. One type of printing technology is inkjet-printing technology, which is more generally a type of fluid-ejection technology. Fluid-ejection devices have fluid-ejection dies that can selectively eject fluid like inks, binding agents, biological samples, agents, reagents, and so on.

BRIEF DESCRIPTION OF THE DRAWINGS

FIG. 2 is a cross-sectional diagram of a portion of an example fluid-ejection die cartridge having a stamped nanoceramic layer, in detail.

DETAILED DESCRIPTION

Figure 1A:
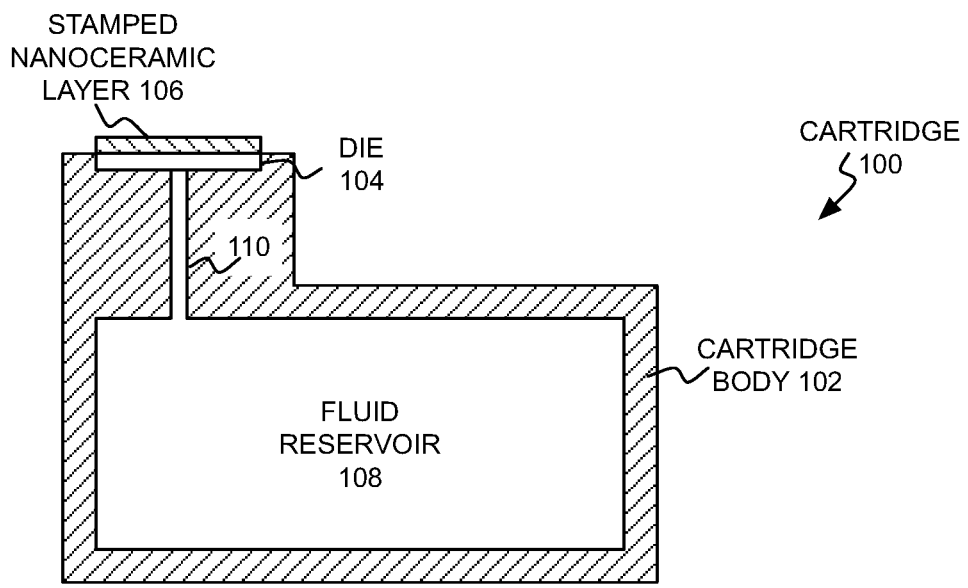
FIGS. 1A and 1B are cross-sectional diagrams of example fluid-ejection die cartridges having stamped nanoceramic layers.

A fluid-ejection device like an inkjet-printing device can include a fluid-ejection die that selectively ejects fluid like inks, binding agents, biological samples, agents, reagents, and so on. The fluid-ejection die may be part of a fluid-ejection die cartridge that also includes a cartridge body to which the die is fluidically attached. For instance, the cartridge may be replaceably insertable into the fluid-ejection device. The cartridge can include a reservoir to hold fluid that the die is to eject, and/or a fluidic connector to fluidically connect the cartridge to a fluid supply external to the cartridge.

Fluid is specifically ejected through nozzles of an exposed nozzle plate of a fluid-ejection die. The nozzle plate can also be referred to as an orifice plate. The nozzle plate may be manufactured from a relatively soft material, such as SU-8 epoxy negative photoresist. The nozzle plate may thus be susceptible to mechanical damage like scratching during usage. Such mechanical damage may occur as a result of contact with media, like paper, during fluid ejection on the media, as well as when the die undergoes cleaning or wiping within the fluid-ejection device at a service station.

The nozzle plate of a fluid-ejection die is further susceptible to fluid puddling and sticking due to the high surface energy of SU-8 epoxy negative photoresist. This is particularly the case with the usage of latex inks, which may dry on the nozzle plate in a manner not unlike latex paint. The die may thus have to undergo frequent servicing to remove dried fluid. Furthermore, the die can suffer from decreased performance if nozzles remain clogged even after aggressive servicing, with a resulting decrease in die life.

Techniques described herein provide for a stamped nanoceramic layer on the exposed fluid-ejection nozzle plate of a fluid-ejection die of a fluid-ejection die cartridge. The nanoceramic layer is a relatively hard layer, and provides the nozzle plate with improved scratch resistance if not anti-scratch properties, inhibiting mechanical damage. The nanoceramic layer is hydrophobic, inhibiting fluid puddling. The nanoceramic layer is relatively slippery, providing the nozzle plate with improved stick resistance if not anti-stick properties, and thus inhibiting fluid sticking.

Stamping the nanoceramic layer on the exposed fluid-ejection nozzle plate of the fluid-ejection die, as opposed to depositing such a nanoceramic layer during die fabrication can be beneficial. The nanoceramic layer may be stamped on the nozzle plate of the die after the fluid-ejection cartridge has been already been assembled, such as after the fabricated die has been attached to the cartridge's body. Stamping may occur just prior to fluid fill of the cartridge in the case in which the cartridge has an internal fluid reservoir.

Stamping the nanoceramic layer on the nozzle plate of the die after assembly of the die cartridge can be more cost effective than depositing the nanoceramic layer during fabrication of the die. Existing manufacturing processes for die fabrication do not have to be altered, avoiding what can be a relatively expensive proposition. Rather, an additional step or act of nanoceramic layer stamping just has to be added after cartridge assembly. Such nanoceramic layer stamping can thus be more easily integrated with existing cartridge manufacture processes.

Figure 1B:
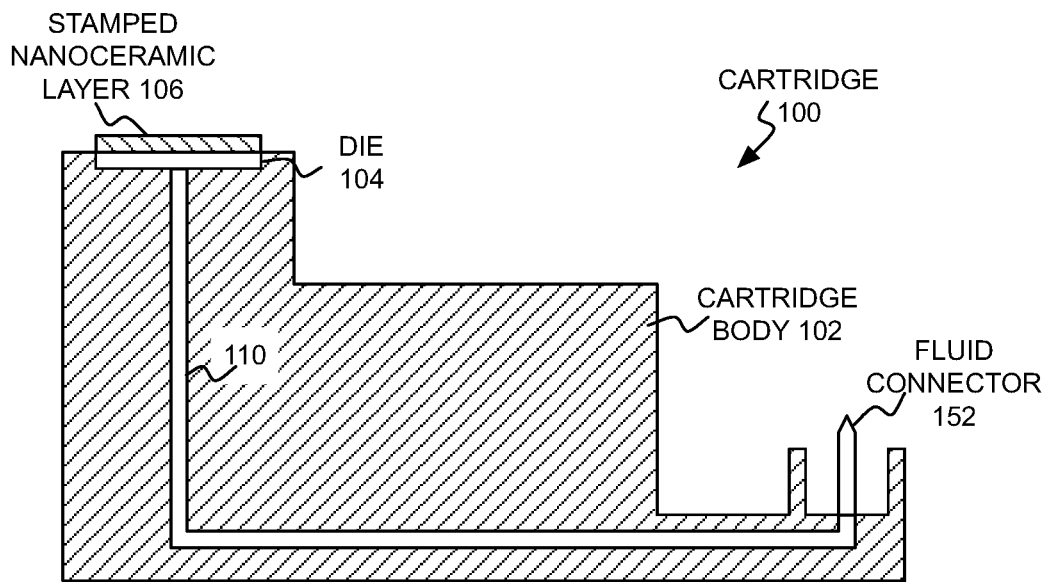

FIGS. 1A and 1B show different examples of a fluid-ejection die cartridge 100. The die cartridge 100 may be replaceably insertable into a fluid-ejection die device. The cartridge 100 may be an inkjet-printing cartridge for an inkjet-printing device, for instance. The cartridge 100 includes a cartridge body 102 to which a fluid-ejection die 104, such as an inkjet die, is fluidically attached. The cartridge 100 includes a stamped nanoceramic layer on the exposed die 104. The cartridge 100 may include other components, too, such as flexible circuits, and so on.

The fluid-ejection die 104 is exposed at an exterior surface of the cartridge body 102 of the die cartridge 100. The die 104 can eject fluid. For instance, the die 104 may include fluid-ejection elements, such as firing resistors, which eject fluid from corresponding chambers and through corresponding exposed nozzles between which the chambers are respectively positioned. The die 104 may include fluid-ejection elements other than firing resistors in a different implementation.

In the example of FIG. 1A, the cartridge body 102 of the die cartridge 100 includes a fluid reservoir 108 that can hold an internal supply of fluid, such as latex ink, and that is fluidically coupled to the die 104 via a fluidic channel 110. One fluidic channel 110 is shown in FIG. 1A, but there can be more than one channel 110. In the example of FIG. 1A, the die 104 ejects fluid from the internal fluid supply of the reservoir 108.

In the example of FIG. 1B, the cartridge body 102 of the cartridge 100 includes a fluidic connector 152 that is fluidically coupled to the die 104 via the channel 110. One fluidic channel 110 is shown, but there can be more than one channel 110. The connector 152 is fluidically connectable to an external supply of fluid, such as latex ink, which the die 104 then ejects in FIG. 1B. In another implementation, the cartridge body 102 can include both the reservoir of FIG. 1A and the connector 152 of FIG. 1B.

FIG. 2 shows a portion of an example fluid-ejection die cartridge 100, such as the cartridge 100 of FIG. 1A or 1B.

The cartridge body 102, the fluid-ejection die 104, the stamped nanoceramic layer 106, and the fluidic channel 110 of the cartridge 100 are specifically shown in FIG. 2. The fluid-ejection die 104 includes a nozzle plate 202, as well as other layers 204. The other layers 204 can include chamber layers, a layer including firing elements such as firing resistors, substrate layers, and so on.

The nozzle plate 202 of the fluid-ejection die 104 is exposed at an external surface of the cartridge body 102. The nozzle plate 202 can also be referred to as a nozzle layer or as an orifice plate or layer. The nozzle plate 202 includes nozzles 206 through which the die 104 ejects fluid. The nozzle plate 202 may be fabricated from SU-8 epoxy negative photoresist. The nozzle plate 202 may be fabricated from other materials in other implementations, however.

The nanoceramic layer 106 is stamped on the exposed nozzle plate 202 of the fluid-ejection die 104. In the example of FIG. 2, the stamped nanoceramic layer 106 does not extend over the cartridge body 102 to either side of the die 104, but in another implementation may do so. In the example of FIG. 2, the stamped nanoceramic layer 106 does not extend over and into the nozzles 206 of the nozzle plate 202, but similarly may do so in another implementation.

In some implementations, the stamped nanoceramic layer 106 may be comparatively thin, with a thickness of no more than one micron. The stamped nanoceramic layer 106 can include ceramic nanoparticles, which are a type of nanoparticle that is composed of ceramics, which are generally classified as inorganic, heat-resistant, and nonmetallic solids that can be made of both metallic and nonmetallic compounds. Examples of such ceramic nanoparticles include silica, silica carbide, and titanium oxide nanoparticles.

The stamped nanoceramic layer 106 may be a layer of anti-graffiti material of hydrocarbon and ceramic ingredients. An example of such an anti-graffiti material is the Nasiol® NL272 nanoceramic vehicle surface protection coating manufactured by Artekya Ltd. Co., of Istanbul, Turkey. Another example of such an anti-graffiti material is the Nasiol® ZR53 nanoceramic vehicle surface protection coating that is also manufactured by Artekya Ltd. Co.

The stamped nanoceramic layer 106 may be a layer of hydrophobic and oleophobic anti-graffiti material of hydrophobic polymer and ceramic ingredients. An example of such a hydrophobic and oleophobic anti-graffiti material is the NanoSilc® NS 200 coating. This anti-graffiti material is manufactured by Florida CirTech, of Greeley, Colo.

The stamped nanoceramic layer 106 can be scratch-resistant if not anti-scratch. For example, the nanoceramic layer 106 may have a scratch hardness greater than 9H in pencil hardness. Pencil hardness is measured along a scale from 6B, indicating maximum pencil softness, to 9H, indicating maximum pencil hardness.

The stamped nanoceramic layer 106 can be stick-resistant if not anti-stick. For example, the nanoceramic layer 106 may have a hydrophobicity greater than a 105-degree water contact angle and/or greater than a 40-degree latex ink contact angle, whereas a nozzle plate 208 fabricated from SU-8 epoxy negative photoresist has less than a 90-degree water contact angle and/or less than a 20-degree latex ink contact angle. The nanoceramic layer 106 may additionally or alternatively have a force of adhesion of less than 0.2 Newtons per 20 millimeters as measured by a cellophane tape peel test.

Figure 3:
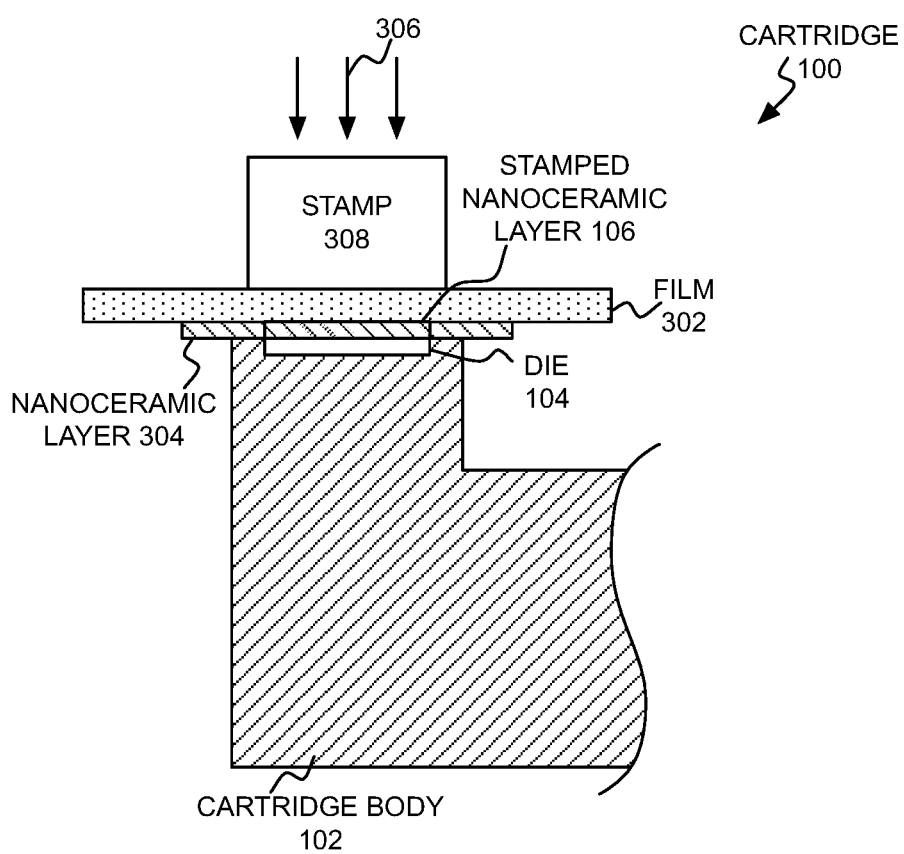
FIG. 3 is a diagram illustrating example stamping of a nanoceramic layer on a fluid-ejection die of a fluid-ejection die cartridge.

FIG. 3 shows example stamping of a nanoceramic layer 106 on the fluid-ejection die 104 of the fluid-ejection die cartridge 100. The stamping process depicted in FIG. 3 is consistent with the stamping process described in the pending PCT patent application entitled "Uniform print head surface coating," filed on Jul. 30, 2019, and assigned PCT patent application no. PCT/US2019/044178. The cartridge body 102, the fluid-ejection die 104, and the stamped nanoceramic layer 106 of the cartridge 100 are specifically shown in FIG. 3.

The assembled fluid-ejection die cartridge 100 and a film 302 are positioned relative to one another so that the die 104 of the cartridge 100 is located under a nanoceramic layer 304 disposed on the film 302. The film 302 may be a polyethylene film. Downwards pressure, as indicated by arrows 306, is applied against a stamp 308 on the topside of the film 302 to stamp a portion of the nanoceramic layer 304 onto the die 104. This portion of the nanoceramic layer 304 forms the stamped nanoceramic layer 106 on the die 104.

Figure 4:
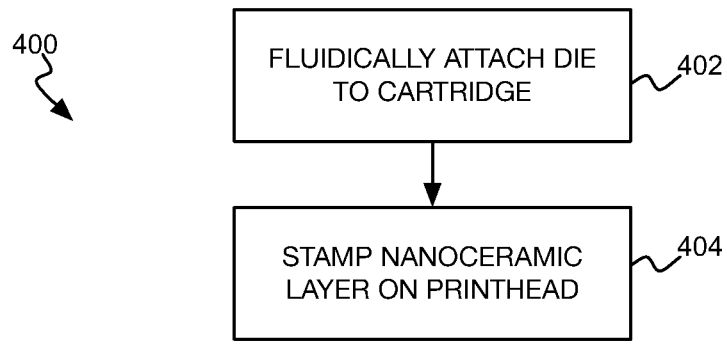
FIG. 4 is a flowchart of an example method of assembly of a fluid-ejection die cartridge having a stamped nanoceramic layer.

FIG. 4 shows an example method 400 for assembling the fluid-ejection die cartridge 100 having the stamped nanoceramic layer 106. The method 400 includes fluidically attaching the fluid-ejection die 104 to the cartridge body 102 (402), thus forming the cartridge 100. The die 104 is attached to the body 102 after both the die 104 and the body 102 have separately been fabricated. Other components of the cartridge 100 may have also already been attached to the body 102 before the die 104 is attached. The fluid-ejection nozzle plate 202 of the die 104 remains exposed after attachment of the die 104 to the cartridge body 102.

The method 400 includes stamping the nanoceramic layer 106 on the fluid-ejection die 104 (404), after the die 104 has been fluidically attached to the cartridge body 102. The nanoceramic layer 106 may be stamped in the manner that has been described with reference to FIG. 3. The nanoceramic layer 106 is specifically stamped on the exposed nozzle plate 202. Once the nanoceramic layer 106 has been stamped on the fluid-ejection die 104, the fluid reservoir 108 of the die 104 may be filled with fluid, in the case in which the die 104 includes such a reservoir 108 as in FIG. 1A.

Figure 5:
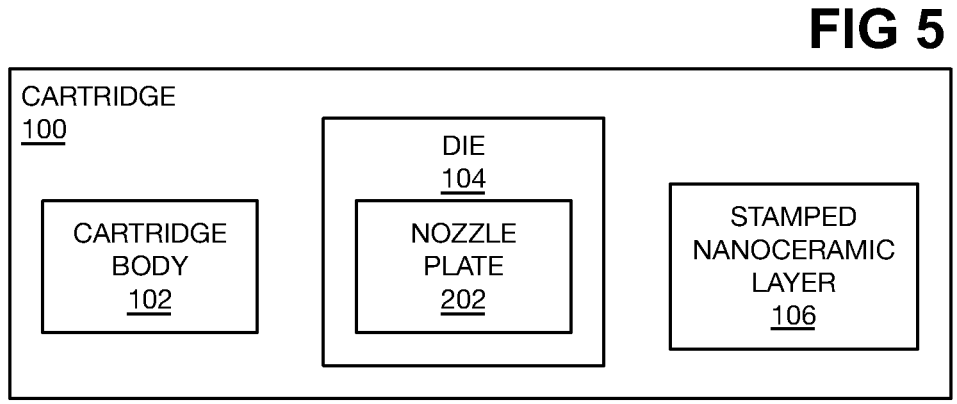
FIG. 5 is a block diagram of an example fluid-ejection die cartridge having a stamped nanoceramic layer.

FIG. 5 shows the example fluid-ejection die cartridge 100. The die cartridge 100 includes the cartridge body 102 and the fluid-ejection die 104, which is fluidically attached to the cartridge body 102 and which can eject fluid. The cartridge 100 includes the stamped nanoceramic layer 106 on the exposed fluid-ejection nozzle plate 202 of the die 104.

Figure 6:
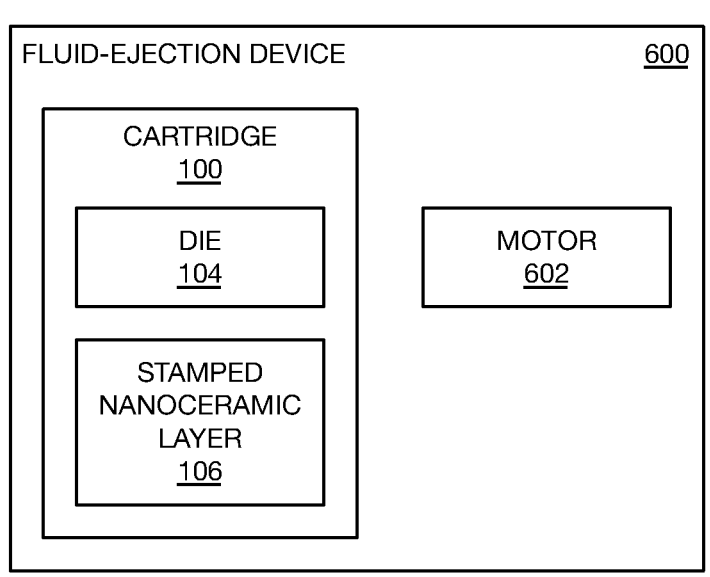
FIG. 6 is a block diagram of an example fluid-ejection device including a fluid-ejection die cartridge having a stamped nanoceramic layer.

FIG. 6 shows an example fluid-ejection device 600. The fluid-ejection device 600 may be an inkjet-printing device. The fluid-ejection device 600 includes a motor 602 and the fluid-ejection die cartridge 100. The device 600 can include other components as well, such as media trays, rollers, processing hardware, communication hardware to communicate with host computing devices or removable data storage media, and so on.

The fluid-ejection die cartridge 100 includes the fluid-ejection die 104 on which the nanoceramic layer 106 has been stamped. The motor 602 advances media past the die 104, and the die 104 ejects fluid on the media. For example, the die 104 may selectively eject ink onto media like sheets of paper to form images on the media.

Techniques have been described herein for a fluid-ejection die having a stamped nanoceramic layer. The die is part of a die cartridge including a cartridge body to which the die can be attached after fabrication and prior to stamping of the nanoceramic layer. The nanoceramic layer reduces the susceptibility of the die to mechanical damage, as well as to fluid puddling and sticking. The nanoceramic layer thus increases die robustness, performance, and operative life.

We claim:

1. A fluid-ejection die cartridge comprising:
   a cartridge body;

a fluid-ejection die fluidically attached to the cartridge body to eject fluid; and a stamped nanoceramic layer on an exposed fluid-ejection nozzle plate of the die.

2. The fluid-ejection die cartridge of claim 1, wherein the stamped nanoceramic layer has a scratch hardness greater than 9H in pencil hardness.

3. The fluid-ejection die cartridge of claim 1, wherein the stamped nanoceramic layer has a hydrophobicity greater than a 105 degree water contact angle and/or greater than a 40-degree latex ink contact angle.

4. The fluid-ejection die cartridge of claim 1, wherein the stamped nanoceramic layer has a force of adhesion less than 0.2 Newtons per twenty millimeters as measured by a cellophane peel test.

5. The fluid-ejection die cartridge of claim 1, wherein the stamped nanoceramic layer comprises silica, silica carbide, or titanium oxide nanoparticles.

6. The fluid-ejection die cartridge of claim 1, wherein the stamped nanoceramic layer comprises a layer of anti-graffiti nanoceramic material.

7. The fluid-ejection die cartridge of claim 1, wherein the stamped nanoceramic layer comprises a layer of hydrophobic, oleophobic, or hydrophobic and oleophobic nanoceramic material.

8. The fluid-ejection die cartridge of claim 1, wherein the stamped nanoceramic layer has a thickness of no more than one micron.

9. The fluid-ejection die cartridge of claim 1, wherein the nozzle plate of the die comprises an SU-8 epoxy negative photoresist nozzle plate.

10. The fluid-ejection die cartridge of claim 1, wherein the fluid comprises latex ink.

11. The fluid-ejection die cartridge of claim 1, wherein the cartridge body comprises a reservoir fluidically coupled to the die to hold a supply of the fluid ejectable by the die.

12. The fluid-ejection die cartridge of claim 1, further comprising:

a fluidic connector attached to the cartridge body and fluidically coupled to the die to fluidically connect to an external supply of the fluid ejectable by the die.

13. A method comprising:

fluidically attaching a fluid-ejection die to a cartridge body, forming a fluid-ejection cartridge including the die and the cartridge body; and stamping a nanoceramic layer on the die after the die has been fluidically attached to the cartridge body.

14. The method of claim 13, wherein after the nanoceramic layer has been stamped on the die, a reservoir of the cartridge body is filled with fluid that the die is to eject.

15. A fluid-ejection device comprising:

a fluid-ejection die cartridge having a fluid-ejection die on which a nanoceramic layer has been stamped; and a motor to advance media past the die, the die to eject fluid on the media.

* * * * *